Oct. 1, 1929. S. A. ESKILSON 1,730,064
WELDING MACHINE
Filed Nov. 6, 1928  5 Sheets-Sheet 1
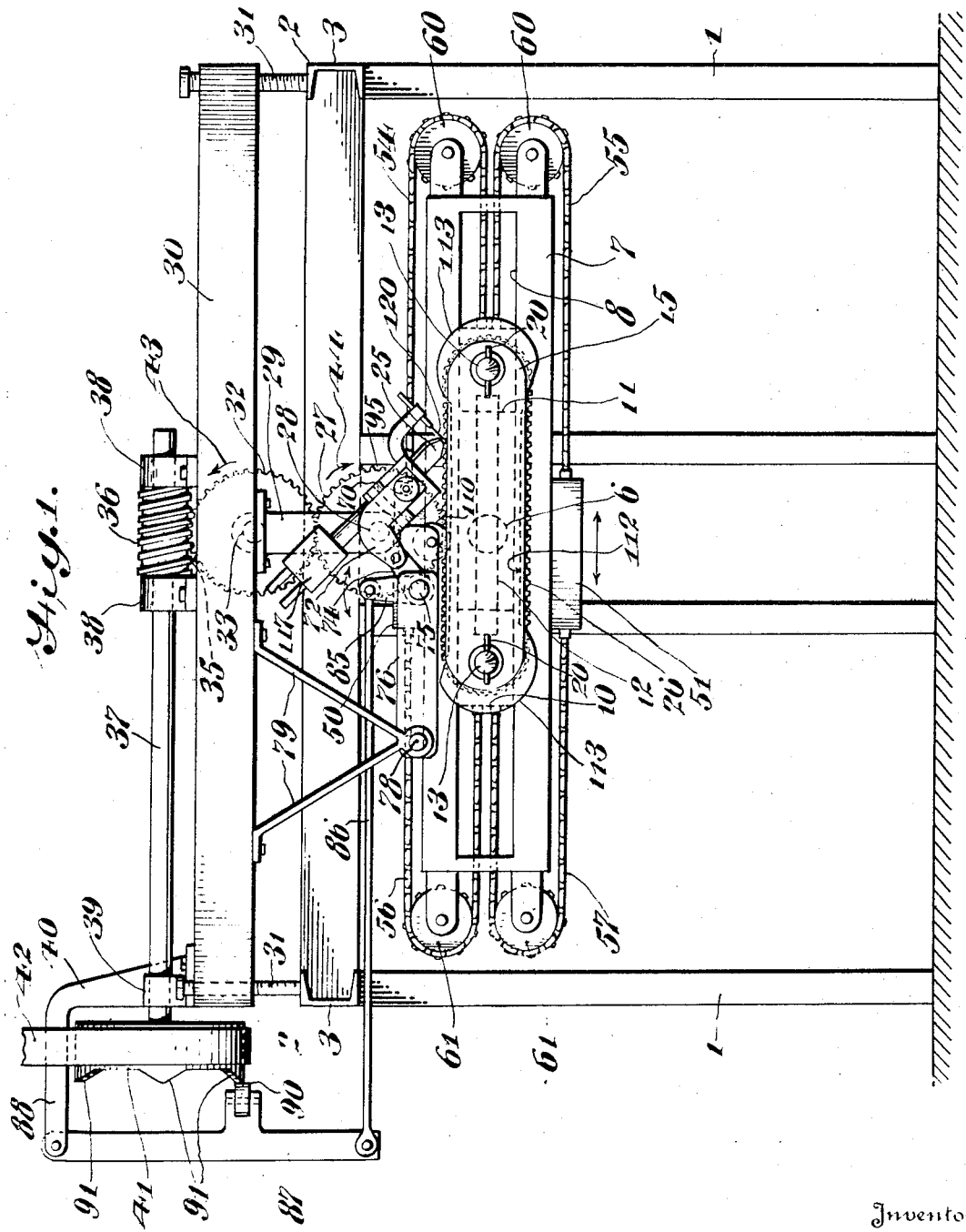
Inventor
Sven August Eskilson
By Cyrus N. Anderson
Attorney

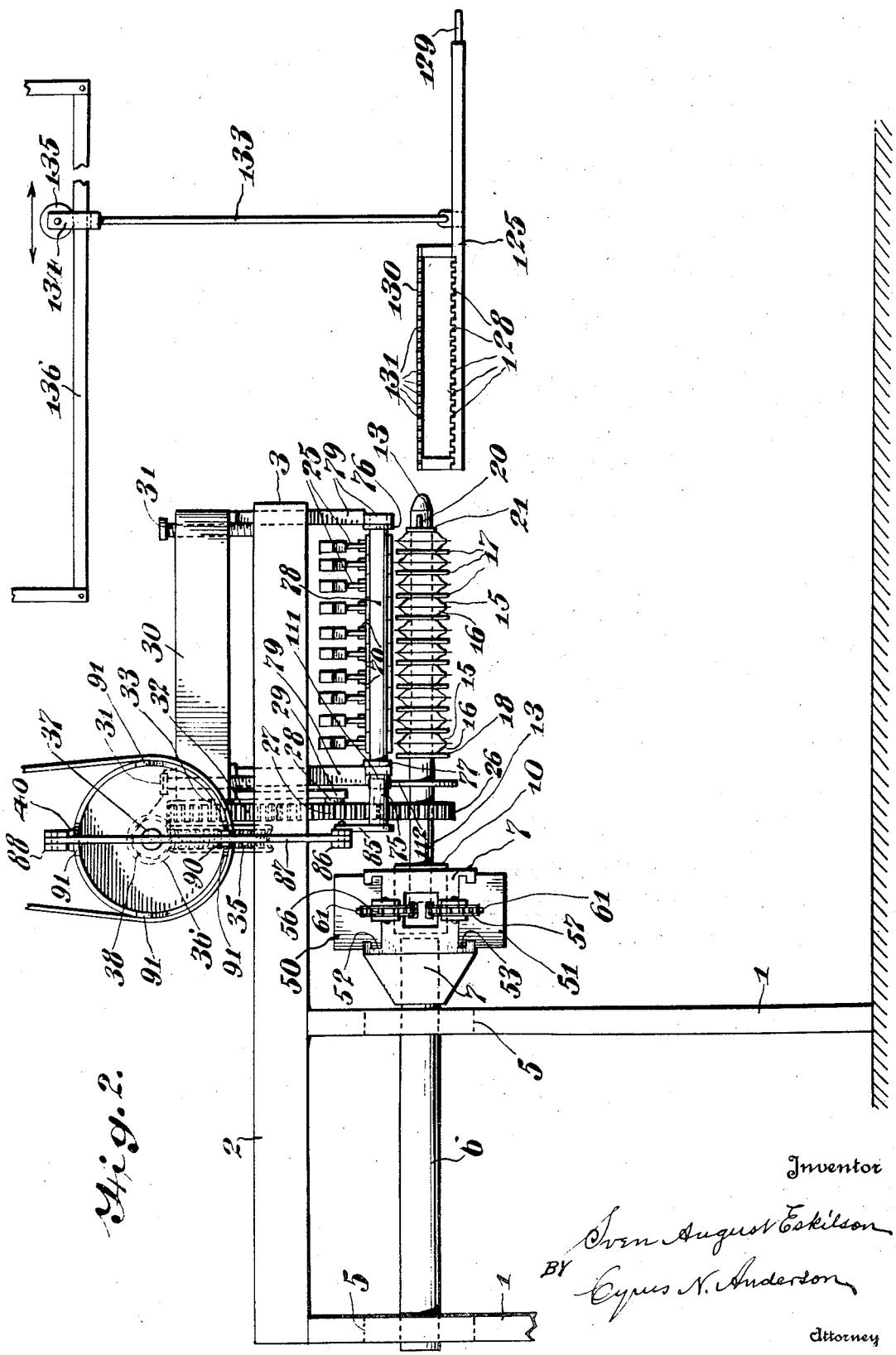

Oct. 1, 1929.  S. A. ESKILSON  1,730,064
WELDING MACHINE
Filed Nov. 6, 1928  5 Sheets-Sheet 3
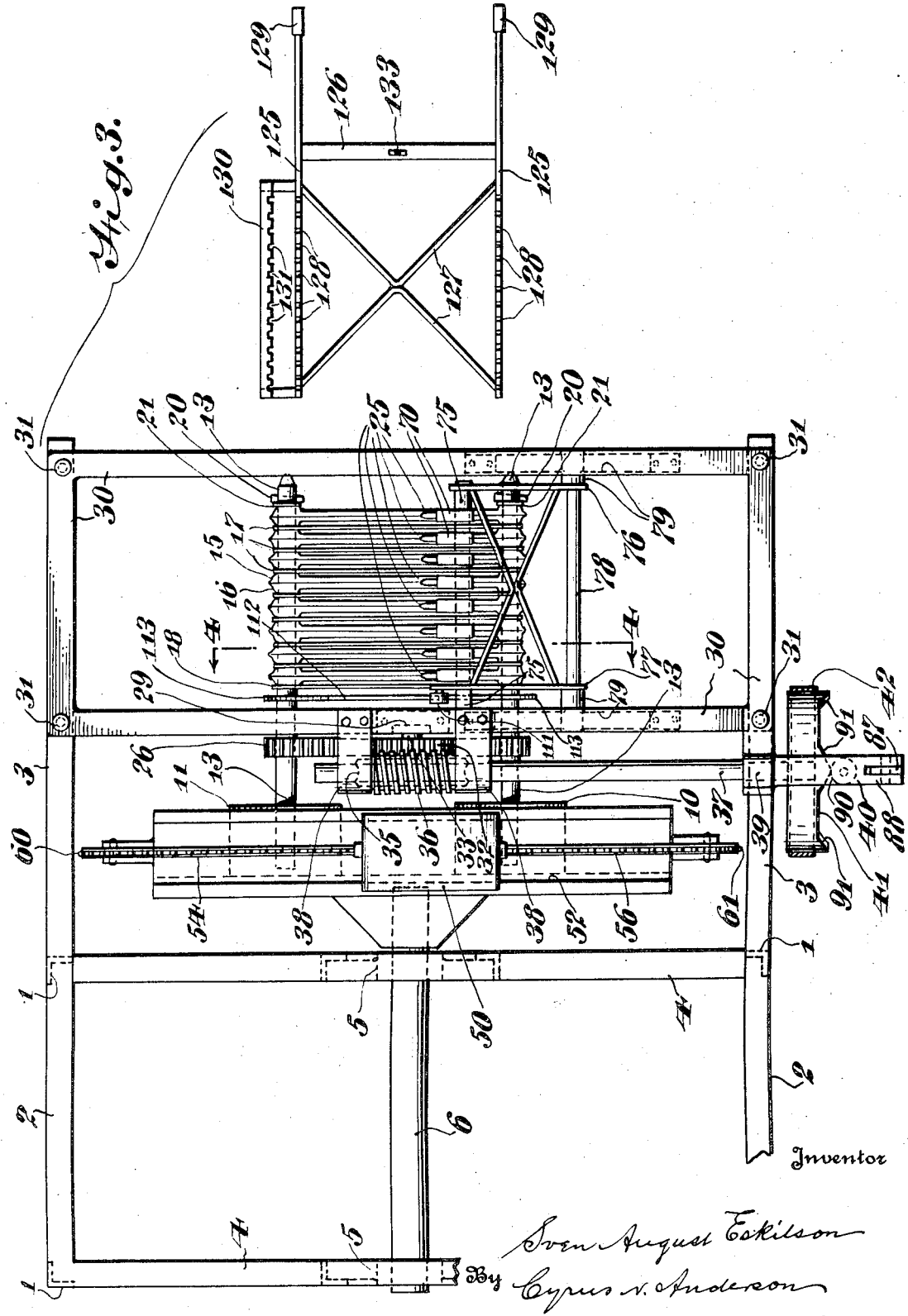
Inventor
Sven August Eskilson
By Cyrus V. Anderson
Attorney

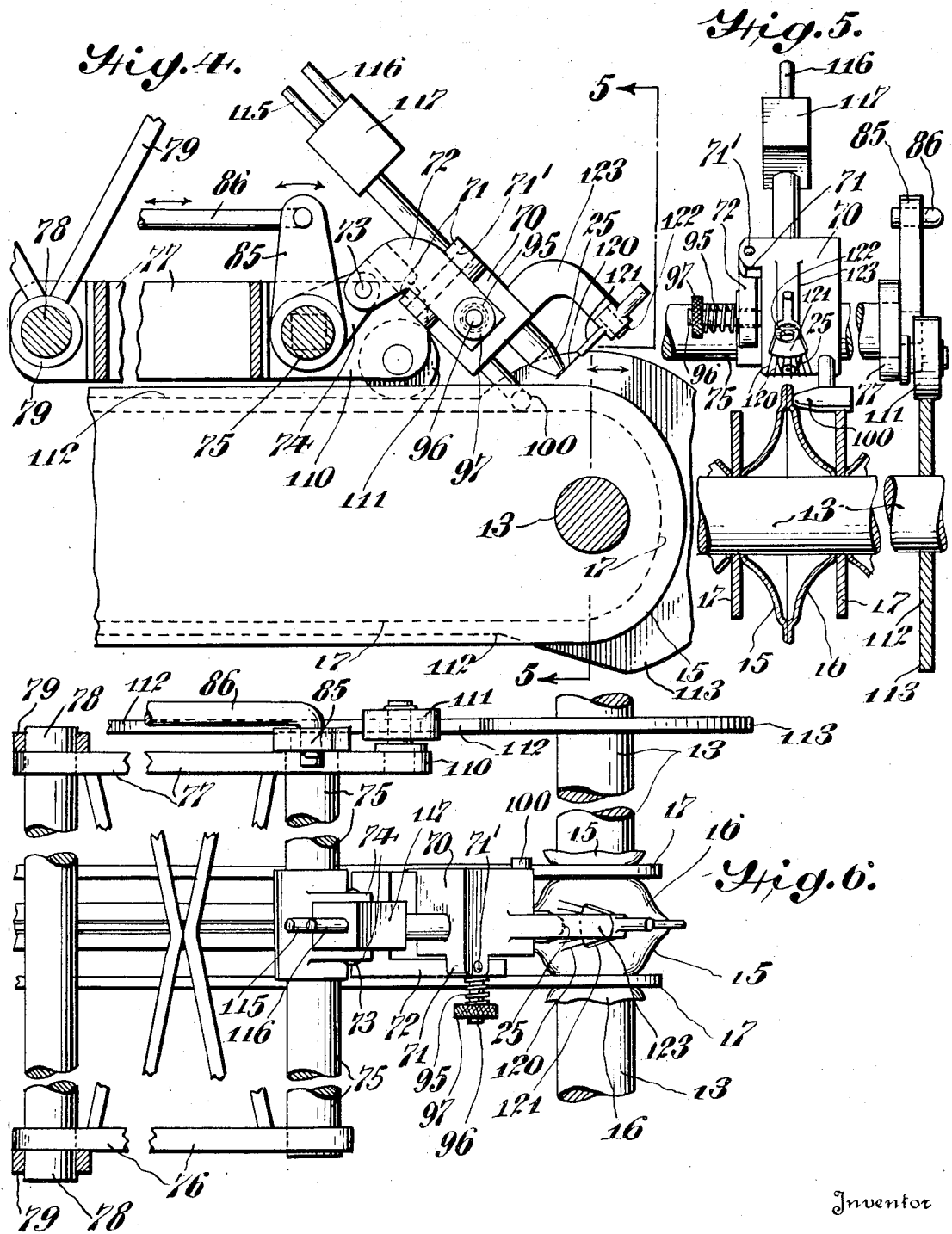

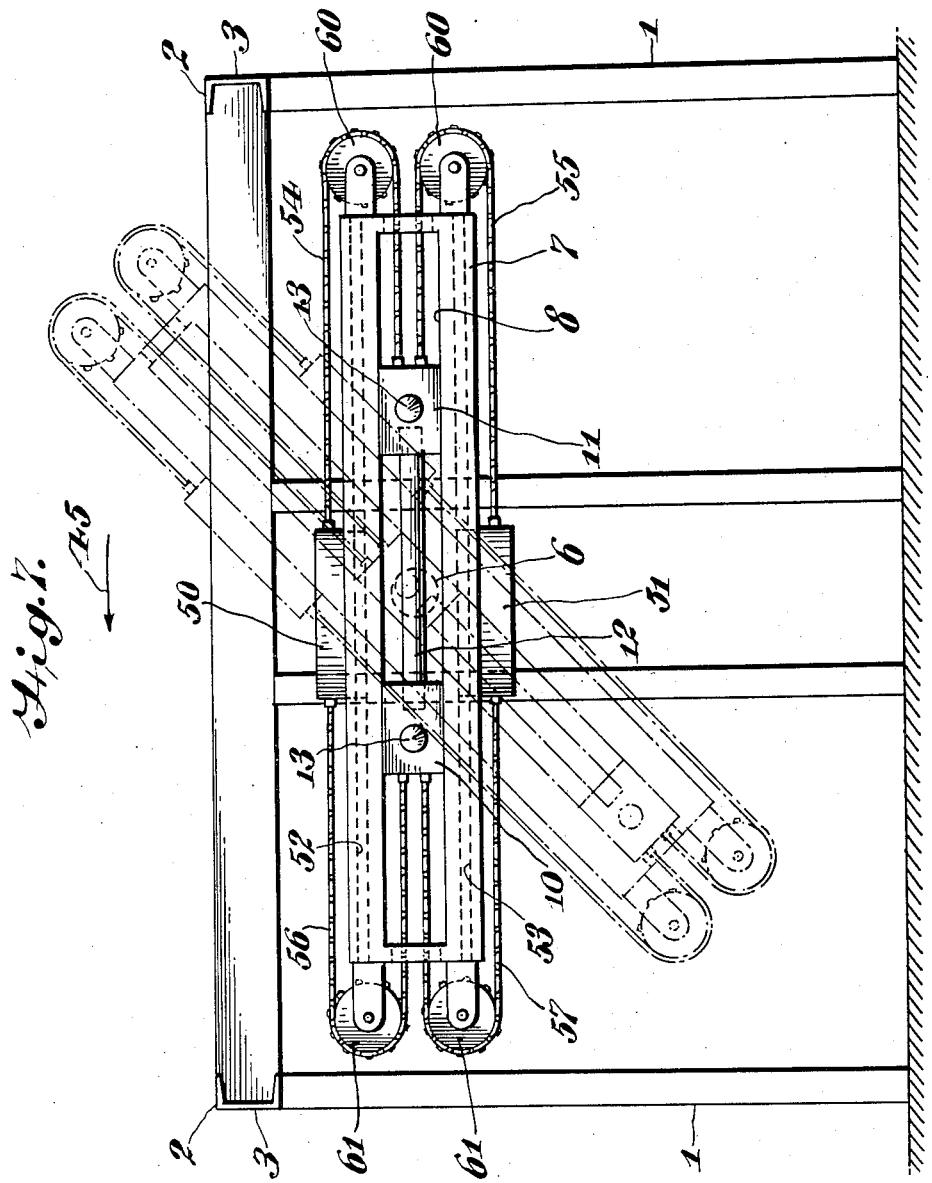

Patented Oct. 1, 1929

1,730,064

UNITED STATES PATENT OFFICE

SVEN AUGUST ESKILSON, OF STOCKHOLM, SWEDEN

WELDING MACHINE

Application filed November 6, 1928, Serial No. 317,524, and in Sweden July 13, 1926.

My invention relates to welding machines and although capable of being employed for welding together the adjoining edges of metal blanks for producing objects of various kinds it is of especial value and utility in welding together the edges of metal blanks in the manufacture of radiator sections and other like devices.

The general object of my invention is to provide a welding machine of novel construction by the employment of which the adjoining contacting edges of metal members to produce objects of various kinds may be effected more rapidly than heretofore has been practical as far as I am aware and with a great saving of labor thereby effecting great economy in the manufacturing process.

It also is an object of my invention to provide a welding machine of novel construction having means whereby a plurality of pairs of metal blanks may be automatically and simultaneously welded together. These blanks may be of a character to produce when welded together radiator sections as above indicated.

A further object of the invention is to provide a machine of the character described having means of novel construction whereby the adjoining edges of a plurality of couples of metal blanks or sections may be simultaneously united and whereby the edges of said couples of blanks to be united are held and moved in such relation to a plurality of welding flames as to cause the said flames to properly impinge upon the edges of said blanks to be united.

A still further object of the invention is to provide a machine having means of novel construction for supporting the edges of a couple of blanks in co-operative relation to a burner and for adjusting the said burner and for causing relative movements between the burner and the edge of the said couple of blanks to be united whereby the flame of the said burner is caused to properly impinge upon the said edge to thereby effect a welding union thereof.

Without attempting at this time to set forth further and more fully the objects and advantages of the invention I shall proceed with the description thereof wherein further objects and advantages either will be set forth specifically or will be apparent.

In order that the invention may be readily understood and its numerous practical advantages fully appreciated reference should be had to the accompanying drawings in which I have illustrated an embodiment thereof in the form which at present is preferred by me.

In the drawings:

Fig. 1 is a view in front elevation of a machine embodying the invention;

Fig. 2 is a view in side elevation looking from the left toward the right in Fig. 1;

Fig. 3 is a top plan view of the machine illustrated in Figs. 1 and 2;

Fig. 4 is a view in transverse sectional elevation taken in the plane of the line 4—4 of Fig. 3, certain portions of the structure being broken away;

Fig. 5 is a view in sectional elevation of a fragmentary portion of the machine taken on the line 5—5 of Fig. 4;

Fig. 6 is a view in top plan of a fragmentary portion of the machine, certain portions thereof being removed in order that other portions may be more clearly shown; and Fig. 7 is a view in front elevation of the machine with portions thereof removed in order that the rotatable supporting and guiding means for the work may be more clearly shown, the said view also showing in dash and dot lines the said supporting and guiding means with the work support thereon in one position occupied thereby during the rotation thereof.

In the drawings I have shown a frame comprising legs 1 the upper ends of which are connected by side sills 2 the forward ends of which are extended, as indicated at 3, to form overhanging portions for supporting portions of the operating mechanism. The legs 1 are also connected together near their upper ends by crosswise extending bars 4 which are provided with bearings, as indicated at 5, for revolubly supporting a shaft 6 upon the forward end of which is mounted a support and guide member 7 of rectangular shape which is provided with a rectangular slot 8 which extends throughout the greater portion of the length thereof, as indicated in Figs. 1 and 7 of the drawings. The work supporting means is slidably mounted within the slot 8 and is adapted to be reciprocated therein as hereinafter will be fully set forth and described. In the construction as illustrated the work supporting means comprises a couple of spaced blocks 10 and 11 which are rigidly connected together by means of a rod 12. It will be understood that instead of a couple of blocks as shown a single block of requisite length may be employed. Work supporting arms 13 of cylindrical shape in cross section are mounted upon the said blocks 10 and 11 and project forwardly therefrom. The work is adapted to be mounted upon the said arms and while supported thereon is adapted to be acted upon by the welding torch or torches as will be hereinafter described. The work shown by way of example in the drawings consists of blanks arranged in couples which, when united at their edges, constitute radiator sections. These blanks are stamped or otherwise formed into proper shape with holes in their opposite end portions through which the arms 13 are adapted to be threaded. It will be noted upon reference to the drawings that the blanks 15 and 16 are arranged in couples with the inner sides of edge portions thereof in adjoining contactual relation with respect to each other. The said couples are separated from each other by means of spacing plates 17 also mounted upon the arms 13. The arms 13 are provided near their inner end portions with a stop plate 18 for limiting the inward or rearward movement of the work thereupon. In order to retain the work in place upon the arms 13 wedges 20 or other suitable retaining means may be employed, between which wedges and the work washers 21 preferably are provided.

The burners 25 for supplying the welding flames for effecting welding union of the adjoining contacting edges of the pairs of blanks are pivotally supported in proper cooperative relation to the edges of the said blanks. It will be apparent that a burner is supplied in co-operative relation to the adjoining edges of each couple; that is, there are as many burners as there are couples of blanks the edges of which are to be welded together.

It will be apparent that in order to effect the welding together of the adjoining edges of the respective couples of blanks it will be necessary that relative movement be effected between the blanks and the burners. In the present construction I have illustrated means whereby the work is rotated, moved and properly related to the burners in the welding operation. To effect rotation of the work I have provided a mangle rack 26 of elliptical shape (that is, of oblong shape with rounded ends) which is engaged with and driven by a gear 27 mounted upon a shaft 28 which in turn is mounted upon a bracket 29 which depends from and is supported by a frame 30 which is adjustably mounted by means of adjusting screw bolts 31 upon the overhanging ends 3 of the side sills or bars 2. The gear 27 is in turn driven by a gear 32 mounted upon a rotatable shaft 33 also supported in the said bracket 29. A worm wheel 35 is also mounted on the shaft 33, which worm wheel is in engagement with a worm 36 mounted upon a shaft 37 mounted at its inner end in bearings 38 and at its outer end in a bearing 39 formed near the base of a bracket 40. The shaft 37 is provided upon its outer end with a wheel 41 which is adapted to be driven by a driving band or belt 42. The shaft 37 is rotated or revolved in a direction to drive the worm wheel 35 and the gear 32 in the direction indicated by the arrow 43 in Fig. 1. Revolution of the wheel 32 in anticlockwise direction, when viewed from the front of the machine, causes rotation or revolution of the gear wheel 27 in the other or clockwise direction, as indicated by the arrow 44 in Fig. 1. The gear wheel 27 being in engagement with the mangle rack 26 which is supported upon the work supporting arms 13 causes reciprocatory or back and forth movement of the arms supporting blocks 10 and 11 in the guide slot 8 of the supporting guide 7 and also causes anticlockwise rotation of the said supporting and guiding member 7 together with the work supported thereby and thereon. Such anticlockwise rotary movement is indicated by the dash and dot lines in Fig. 7 of the drawings and also by the arrow 45 in said figure. In order to counterbalance the work supporting blocks and the work supported thereby during the rotary movements of the work supporting and guiding member 7 I have provided counterbalance weights 50 and 51 which are slidably mounted in undercut grooves 52 and 53 which are provided in the opposite outer sides of the said work supporting and guiding member 7. Upon reference to Fig. 2 of the drawings it will be noted that the counterbalance weights 50 and 51 are provided upon their inner sides with portions shaped to fit the said undercut grooves 52 and 53. To render the counterbalance weights effective a couple of chains are connected at their inner ends to the outer end of each of the blocks 10 and 11. These chains are designated 54, 55, 56 and 57. The chains 54 and 55 are connected at their inner ends to an outer end of the block 11 and at their outer ends respectively to the right hand ends of the counterbalance weights 50 and 51. The chains are conducted over or extended around sprocket wheels 60. In like manner the chains or cords 56 and 57 are connected at their inner ends to the other outer end of the block 10. The said cords 56 and 57 are extended around sprocket wheels 61 and are connected at their outer ends to the left hand ends of the counterbalance weights 50 and 51.

Upon reference to Fig. 1 of the drawings it will be apparent that when the work together with the blocks 10 and 11 are moved toward the left and that as the work support and the work supported thereon are rotated as indicated in Fig. 7 the work will exert a considerable force downwardly due to gravity. Such force will be counterbalanced by the weights acting through the chains or cords 54 and 55. Upon the continued rotation of the work supporting and guiding means 7 together with the work supported thereon the conditions, as will be obvious, will be reversed so that the counterbalance weights will act through the chains or cords 56 and 57 to counterbalance the weight of the work and of the support therefor including the blocks 10 and 11 which are slidable in the rectangular slot 8.

I shall now describe the means for supporting the burners and for maintaining the same in the desired co-operative relation with respect to the edges of the blanks to be welded together by the application thereto of welding flames. The respective burners are mounted in blocks 70 which are provided with ears 71 which embrace the opposite edges of the respective levers 72 and are pivotally connected therewith by pivot pins 71', which pins extend through the said ears and through the said levers, as indicated in Fig. 4. The said levers are pivotally supported at their rear ends upon pivots 73 provided in the upper end portions of forwardly and upwardly extending arms 74 provided upon a rock shaft 75. The opposite ends of the rock shaft 75 are rotatably mounted in bearings provided near the front ends of parallel arms 76 and 77 pivotally secured at their rear ends to a shaft 78 supported at its opposite ends in openings provided in the lower ends of brackets 79 of V-shape which are supported by and depend from the opposite sides of the adjustably supported frame 30, previously referred to. By mounting the burners as thus described it will be apparent that they are adapted to be moved pivotally both laterally or in a horizontal direction and vertically.

For the purpose of imparting rocking movements to the shaft 75 and the arms 74 carried thereby I have provided the said shaft with an upwardly extending arm 85 to the upper end of which the front end of a link 86 is connected, the opposite outer end of which is pivotally conected to the lower end of a swinging arm 87 which is pivotally connected at its upper end to the outer end of an arm 88 which consists of a lateral horizontal extension of the upper end of the bracket 40.

The inner side of the swinging arm 87 is provided with a roller 90 which is adapted to be engaged by cam projections 91 provided at intervals upon the outer side of the drive wheel 41 previously referred to. It will be apparent that as these projections contact with the roller 90 they cause outward movement thereof which in turn causes outward longitudinal movement of the link 86 to impart rocking movement of the arm 85 and the shaft 75 in like direction. These parts are returned to the right or what may be called normal position by the action of gravity.

The respective blocks 70 for supporting the burners are held in yielding relation with respect to the levers 72 by means of springs 95 coiled about pins 96 the inner end portions of which extend through the said levers 72 and are mounted upon the blocks 70. The inner ends of the said springs bear against the adjoining sides of the levers 72 while the outer ends bear against adjustable nuts 97. It will be apparent that these springs may be so tensioned as to yieldingly hold the blocks 70 against the adjoining sides of the levers 72 with such force as may be desired. The purpose of yieldingly holding the said blocks as described is to cause the operative ends of the guides 100 which are mounted upon the blocks 70 to bear against the sides of the adjoining edge portions of the blanks of the couples the edges of which are to be welded. The said blocks and guides 100 being yieldingly held it follows that the blocks and the burners are adjusted automatically in horizontal directions to correspond with any irregularities which may be present in the surface of the blank so that the burner is maintained in proper position directly opposite the edges of the blanks to be united. The guides 100 rest upon the edges of the spacing plates 17, which plates act not only to place the couples of blanks from each other but also as guides for maintaining the burners in proper spaced position with respect to the edges of the couples of blanks to be united.

For the purpose of maintaining the burners in proper angular relation to the edges of the couples of blanks to be welded together I have provided the arm 77 with an extension 110 and have mounted upon such extension a roller 111 which contacts with and is guided by the edges of a guide plate 112. The edges of the intermediate portions of the said guide plate are parallel with each other, as indicated in Fig. 4 of the drawings. The opposite ends of the plate are enlarged and the edges thereof are circular, as indicated at 113. The purpose of the circular edges upon the enlarged ends is to elevate the forward end portions of the arms 76 and 77 as the opposite end portions of the work are moved underneath and past the burners so as to cause angular adjustment of the burners so that they will hold or occupy the same angular relation to the curved opposite end portions of the work that they do to the straight intermediate edge portions thereof.

The fuel for the burners may consist of acetylene and oxygen which is supplied through pipes 115 and 116 to mixing chambers 117 from which the mixed gases flow to the burners 25.

The purpose of rocking or oscillating the shaft 75 and the arms 74 carried thereby is to cause a slight back and forth movement of the burner nozzles in directions lengthwise of the abutting edges of the blanks which are being welded together. By thus moving the burners the liability of overheating any portion of the metal of the blanks which are being united is avoided. By this means the application of the welding flame to the edges being welded is controlled in a manner simulating the control and operation effected or which may be effected when the work is performed by manual operation.

In the welding operation it happens very often that slag is produced. Its presence results in sparks which have a tendency to adhere to the mouths or openings of the burner nozzles which results in diminishing the flames. For the purpose of cleansing the burner mouths or openings and removing therefrom such slag as may be deposited thereon I have provided wire brushes 120 located in front of the ends of the burners and supported upon carriers 121 which are pivotally mounted upon pivots 122 formed upon the outer ends of forwardly projecting bent arms 123 provided upon the forward portions of the upper sides of the burner supporting blocks 70. By causing back and forth pivotal movement of the carriers 121 the brushes 120 may be caused to move back and forth across the forward ends of the burners 25 to remove any slag or any other deposits therefrom. The carriers 121 may be individually or independently operated manually or if desired they may be connected together and all of them operated manually or otherwise simultaneously.

To facilitate the placing of the work upon the arms 13 I have provided movable means located in front of the machine and in proper relation to the said arms upon which the work is adapted to be placed and thereafter moved toward the arms to cause the threading or entering of the latter through the openings in the opposite ends of the blanks which are to be united in couples as described. The said means comprises a frame including parallel bars 125, which bars are connected by means of a cross bar 126 and angular brace bars 127. The bars 125 are provided with notches 128 in the upper edges of the portions thereof adjoining the work supporting arms 13. The opposite ends of the said arms beyond the cross bar 126 are provided with handle portions 129. One of the bars 125 is provided with a bar 130 located in elevated lateral position with respect thereto which is provided upon its inner edge with notches 131 located in alinement with the notches 128. The notches 131 are adapted to engage the ends of the blanks placed in the notches 128 and support or maintain the said blanks in vertical position. The frame is supported at the lower end of a depending swinging rod 133 provided with a forked upper end 134 within which a roller 135 is mounted, which roller engages the upper edge of a stationary supporting bar 136, the said bar extending between the sides of the forked portion 134. By means of the handles 129 previously referred to the said frame with the work supported thereon may be moved inwardly to cause the arms 13 to thread into or engage the openings in the opposite end portions of the work, as previously described.

It is believed that the operation of the machine will be quite obvious and clear from the description thereof hereinbefore given and therefore that it is unnecessary to include a further statement as to the manner in which the machine operates.

It will be seen that by my invention I have provided a machine having means whereby couples of blanks may be supported with the edges which are to be united in proper cooperative relation to the burners which are adapted to produce welding flames and that I have provided means whereby the requisite relative movements between the work and the burners may be effected automatically and in a manner to effect the welding operation in an expedient and efficient manner.

Having thus described my invention, what I claim and desire to secure by Letters Patent is:

1. Apparatus for welding together the edges of a couple of metal blanks, comprising means for holding the said blanks in assembled relation with their edges in contact with each other, a burner supported in operative relation to the said edges, and means for effecting reciprocatory movement of the said holding means and the blanks held thereby and the said means also causing rotative movement of the said holding means and the said blanks, the rotation of the said blanks being in the plane of contact of the edges thereof whereby the edges of both the sides and ends of said blanks may be presented to said burner.

2. Apparatus for welding together the edges of each pair of a plurality of pairs of metal blanks having straight and curved edges, comprising means for holding the blanks of each pair in assembled relation with their edges in contact with each other, a plurality of burners disposed in operative relation to the said edges, means for causing the said holding means and the blanks held thereby to travel as a unit toward and past the said burners in the direction in which the joints between the said edges extend for simultaneously welding the said edges together, and means for causing rotative movement of said holding means to cause rotative movement of said pairs of blanks in the planes of contact of their edges whereby both the straight and curved portions of the said edges may be presented to said burners.

3. Apparatus for welding together the edges of each pair of a plurality of pairs of metal blanks of general elliptical shape, comprising means for holding the blanks of the respective pairs in assembled relation with their edges in contact, a plurality of burners disposed in operative relation to the edges of the respective pairs of blanks which are to be welded together, and means for causing reciprocative and rotative movements of the said holding means and the pairs of blanks held thereby, the rotation of said pairs of blanks being in the planes of contact of their edges to cause the contacting edges of the said pairs of blanks to move past and in operative relation to the said burners.

4. Apparatus for welding together the edges of each pair of a plurality of pairs of metal blanks having curved ends, comprising a rotatable member, a work support mounted upon said member and movable transversely thereon for supporting said blanks and holding them in assembled relation, a plurality of burners respectively disposed in operative relation to the contacting edges of the blanks of the respective pairs, and means for causing reciprocative and revoluble movements of the work support and the pairs of blanks supported thereby, the revolution of said pairs of blanks being in the planes of the contacting edges thereof to thereby present the edges of both the sides and ends thereof to said burners.

5. Apparatus for welding together the edges of each of the pairs of a plurality of pairs of oblong metal blanks having straight parallel side edges and rounded end edges, comprising a work support for holding the said blanks in assembled relation with the contacting edges thereof located in parallel planes, a plurality of burners supported respectively in the respective planes of the said edges and in operative relation thereto, and means for moving said work support and the blanks carried thereby as a unit rectilinearly and rotatively in the planes of the contacting edges of the respective pairs of blanks whereby the straight side edges and the rounded end edges of the said blanks are caused to move past the said burners.

6. Apparatus for welding together the contacting edges of each pair of a plurality of pairs of metal blanks having sides and ends, comprising a rotatable member, a work support slidably supported upon said member, the said work support having means for supporting the said blanks in assembled relation with the edges of each pair of blanks in contact, a plurality of burners supported laterally of the said work support, the respective burners being located in the planes of the contacting edges of the respective pairs of blanks, and power driven means for causing reciprocative and rotative movements of the said work support thereby causing rotative movement of the pairs of blanks in the planes of contact of the edges thereof to present the contacting edges of both sides and ends of said pairs of blanks to said burners.

7. Apparatus for welding together the contacting edges of a pair of metal blanks having side and end edges which are to be welded together, comprising a work support for holding said blanks with their edges in contact with each other, a burner disposed in operative relation to the said contacting edges of said blanks, means for oscillating the said burner in a plane common to the plane of contact of the edges of said blanks, and means for causing reciprocative and rotative movements of said work support and the blanks carried thereby, the rotation of said blanks being in the plane of the contacting edges thereof to thereby present both the side and end edges thereof to the said burner.

8. Apparatus for welding together the contacting edges of each pair of a plurality of pairs of metal blanks, comprising a support for holding the blanks of the respective pairs in assembled relation with their edges in contact with each other, a plurality of burners movably supported in operative relation to the said edges, there being a separate burner for each pair of contacting edges, and means co-operating with the blanks to adjust said burners transversely of said blanks and maintain them respectively in the planes of contact of the said contacting edges.

9. Apparatus for welding together the contacting edges of a pair of metal blanks, comprising a work support for holding the said blanks in assembled relation with their edges in contact with each other, a movably supported burner for welding the said edges together, and means having connection with said burner and contacting with the outer side of one of the blanks of said pair of blanks to guide the said burner in predetermined relation to the contacting edges of said blanks.

10. Apparatus for welding together the edges of each pair of a plurality of pairs of metal blanks which comprises means for holding the said blanks in assembled relation with the edges of the respective pairs in contact with each other, a plurality of burners, means for movably supporting the respective burners in co-operative relation to and in the planes of the contacting edges of the respective pairs of blanks, means located between the burners and the respective pairs of blanks and contacting with the outer side of one of the blanks of each of said pairs of blanks to maintain the said respective burners in the planes of the contacting edges of the respective pairs of blanks, and means acting automatically for maintaining the nozzles of the said burners at substantially constant distances from the said edges during the welding operation.

11. Apparatus for welding together the edges of a pair of metal blanks which comprises means for holding the said blanks in assembled relation with their edges in contact with each other, a burner movably supported in operative relation to the line of contact between the edges of said blanks, means having operative connection with the burner and co-operating with said blanks to adjust the said burner transversely of the said edges to maintain the same in predetermined relation thereto, and means acting automatically for adjusting the said burner in directions parallel with the plane of contact of the said edges.

12. Apparatus for welding together the edges of a pair of metal blanks which comprises means for holding the said blanks in assembled parallel relation with the inner sides of their outer edge portions in contact with each other, a burner movably supported in operative relation to the line of contact between the said sides, means interposed between the said burner and said blanks and co-operating with the latter to maintain the said burner in the plane of contact of the inner sides of said edge portions, and means for oscillating the said burner in said plane.

13. Apparatus for welding together the edges of a pair of metal blanks which comprises means for holding the said blanks in assembled parallel relation with their outer edges in contact with each other, a burner movably supported in operative relation to the said edges, means located between the burner and said blanks and co-operating with the latter to maintain the said burner in the plane of contact of the edge portions of said sides, means for oscillating the said burner in the said plane, and means for maintaining the said burner at a substantially constant distance from the edges of the said blanks.

14. Apparatus for welding together the contacting edges of a pair of metal blanks having straight side and curved end edges, which comprises a burner, means for holding the said blanks in assembled parallel relation with their outer edge portions in contact with each other, means for moving said blanks past said burner, means for rotating said blanks in the plane of contact of their outer edge portions, means having operative connection with said burner and co-operating with one of said blanks to cause movement of said burner to maintain the same in predetermined relation to the said edge portions and means acting automatically to vary the angle of inclination of the said burner to maintain it at the same angle with respect to both the side and end edges of the pair of blanks during the movement of the said blanks past the said burner.

15. Apparatus for welding together the contacting edges of each pair of a plurality of pairs of metal blanks having straight sides and curved ends, which comprises means for holding the said blanks in assembled relation with the blanks of the respective pairs in parallel relation to each other with their edges in contact, a plurality of movably supported burners disposed respectively in operative relation to the edges of the respective pairs of blanks which are to be welded together, and means for varying the angle of inclination of the said burners to maintain them at the same angle with respect to both the side and end edges of the said pair of blanks.

16. Apparatus for welding together the contacting edges of each pair of a plurality of pairs of metal blanks of general elliptical shape, comprising a support for said blanks which support is adapted to hold the blanks of the respective pairs in parallel relation to each other with the outer edge portions thereof in contact with each other, the planes of contact of the several pairs of burners being in parallel relation to each other, a plurality of burners movably supported in operative relation to the contacting edges of the said pairs of blanks, there being a burner for each pair of blanks, means for effecting reciprocative and rotative movements of the said blank supporting means to cause the contacting edges of the respective pairs of blanks to move past the respective burners associated with said edges, means for varying the angle of inclination of the said burners with respect to the said contacting edges to maintain the same at the same angle with respect to both the side and end edges of the said pairs of blanks during the movement of said blanks past the said burner, means for oscillating the said burners during the operation of the apparatus, means interposed between the burners and the respective pairs of blanks and co-operating with the latter to maintain the said burners in alinement with the edges of the respective pairs of blanks, and means for maintaining the said burners at substantially constant distances from the edges of the respective pairs of blanks.

17. A welding machine for welding together the side and end edges of a pair of blanks, comprising a rotatable supporting member, a work support mounted on said member, a heating means supported in co-operative relation to the edges of said blanks, means for causing reciprocative and rotative movements of said work support to present the side and end edges of said blanks to the said heating means, and means for counterbalancing the weight of the said work support and any work which may be supported thereon as the said work support moves from one position to another relatively to its support during its reciprocative movements.

18. Apparatus for welding together a pair of oblong blanks with rounded ends, comprising a work support adapted to hold the said blanks in assembled parallel relation to each other with their outer edges in contact, means for supporting a burner with its nozzle in co-operative relation to the said edges and substantially in the plane of contact thereof, means for causing reciprocative and rotative movements of said work support to cause movement of the said contacting edges past and in operative relation to the nozzle of said burner, and means for increasing the angle of said burner with respect to a horizontal plane as the rounded ends of said blanks are moved in co-operative relation with and past the nozzle thereof.

19. In apparatus for welding together the edges of metal blanks, the combination of a frame, means for supporting a pair of said blanks with their edges in contact with each other, heating means movably supported for oscillation, independent of the frame in operative relation to the edges of said pair of blanks, means for effecting movement of the said blanks relative to the said heating means, and means co-operating with the outer side of one of the blanks of the said pair of blanks near the edge thereof which is being welded for guiding the said heating means with respect to the edges which are being welded together.

20. In apparatus for welding the edges of blanks together, the combination of means for supporting a pair of said blanks with their edges in contact with each other, a burner, a pivot located in the plane of contact of said edges for supporting said burner, means for causing relative movement between the said pair of blanks and the said burner, and means operatively related to the said burner and contacting with a side of one of the said blanks near the edge thereof and adapted to cause pivotal movement of said burner about said pivot to maintain it in operative relation to the edges of said pair of blanks.

21. An apparatus for welding the edges of a pair of blanks together, comprising a support for holding the said blanks in assembled relation with their edges in contact with each other, a heating means, a pivot for pivotally supporting the said burner in the plane of contact of the edges of said pair of blanks, means for causing relative movement between the said pair of blanks and the said heating means to present the edges thereof throughout their entire length to the said heating means, and means mounted upon the said heating means and contacting with a side of one of the said blanks in adjoining relation to the edge thereof and adapted by reason of such contact to cause movement of said heating means about said pivot to thereby guide the said heating means and maintain it in desired relation to the plane of contact between the edges of the said pair of blanks.

22. An apparatus for welding together the edges of blanks, comprising means for supporting a pair of blanks in assembled relation with their edges in contact with each other, a burner, a pivot for pivotally supporting said burner with its nozzle in the plane of contact of the edges of said pair of blanks, means for causing movement of the said pair of blanks to present the edges thereof throughout their length to the said burner, and means interposed between the said burner and the said blanks and having connection with the former and contacting with one of the latter near the edge thereof for causing pivotal movement of said burner to thereby guide and maintain the nozzle thereof in the plane of contact of the edges of the said pair of blanks.

In testimony that I claim the foregoing as my invention I have hereunto signed my name this 22nd day of October, A. D. 1928.

SVEN AUGUST ESKILSON.